(12) United States Patent
Sun et al.

(10) Patent No.: US 8,906,134 B2
(45) Date of Patent: Dec. 9, 2014

(54) ENGINE-OUT SOOT FLOW RATE PREDICTION

(71) Applicant: GM Global Technology Operations LLC, Detroit, MI (US)

(72) Inventors: Min Sun, Troy, MI (US); Michelangelo Ardanese, Royal Oak, MI (US); Jean-Yves Lavallee, Farmington Hills, MI (US); Amanpal S. Grewal, Novi, MI (US); Paul Jasinkiewicz, Northville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 9 days.

(21) Appl. No.: 13/671,918

(22) Filed: Nov. 8, 2012

(65) Prior Publication Data
US 2014/0123608 A1 May 8, 2014

(51) Int. Cl.
*B01D 39/06* (2006.01)
*B01D 39/20* (2006.01)
*B01D 39/14* (2006.01)
*B01D 50/00* (2006.01)
*B01D 46/46* (2006.01)
*F02D 41/14* (2006.01)
*F02D 41/02* (2006.01)
*F01N 11/00* (2006.01)
*B01D 46/00* (2006.01)
*F01N 9/00* (2006.01)

(52) U.S. Cl.
CPC ....... *F01N 11/007* (2013.01); *F01N 2900/1606* (2013.01); *F02D 41/1454* (2013.01); *F02D 41/029* (2013.01); *F01N 11/00* (2013.01); *F01N 2560/026* (2013.01); *F02D 2200/0618* (2013.01); *F01N 2900/08* (2013.01); *F02D 41/1467* (2013.01); *F01N 2550/04* (2013.01); *B01D 46/0057* (2013.01); *F01N 2900/1402* (2013.01); *F01N 9/002* (2013.01); *F02D 41/1461* (2013.01); *Y02T 10/47* (2013.01)
USPC ........ 95/1; 55/522; 55/523; 55/524; 422/169; 422/170; 422/171; 422/172; 422/177; 422/178; 422/179; 422/180; 422/181; 422/182

(58) Field of Classification Search
CPC ........... Y02T 10/24; B01D 2251/2062; B01D 53/56; B01D 23/00; B01D 45/00; F01N 13/02
USPC ................... 95/1; 55/522–524; 422/169–172, 422/177–182
See application file for complete search history.

(56) References Cited

U.S. PATENT DOCUMENTS

| | | | | |
|---|---|---|---|---|
| 7,799,289 | B2 * | 9/2010 | Robel | 422/180 |
| 2009/0035194 | A1 * | 2/2009 | Robel et al. | 422/177 |
| 2009/0035195 | A1 * | 2/2009 | Robel | 422/177 |
| 2009/0304559 | A1 * | 12/2009 | Steichen et al. | 422/177 |
| 2010/0021355 | A1 * | 1/2010 | deRuyter | 422/177 |
| 2010/0101409 | A1 * | 4/2010 | Bromberg et al. | 95/8 |
| 2011/0061366 | A1 * | 3/2011 | Nagaoka et al. | 60/274 |

* cited by examiner

*Primary Examiner* — Amber Orlando
(74) *Attorney, Agent, or Firm* — Cantor Colburn LLP

(57) ABSTRACT

A method for engine-out soot flow rate prediction of an exhaust gas treatment system is provided. A measured level of oxides of nitrogen in the exhaust gas treatment system is received. An engine fuel injection timing and air-fuel ratio of an engine producing the oxides of nitrogen are also received. An engine timing factor is determined based on the engine fuel injection timing. An engine air-fuel ratio factor is determined based on the engine air-fuel ratio. An engine-out soot flow rate prediction is generated based on the measured level of oxides of nitrogen, the engine timing factor, and the engine air-fuel ratio factor.

12 Claims, 3 Drawing Sheets

ENGINE-OUT SOOT FLOW RATE PREDICTION

FIELD OF THE INVENTION

The subject invention relates to methods, and systems for engine-out soot flow rate modeling to predict soot loading associated with a particulate filter.

BACKGROUND

The emission of particulate matter in exhaust from compression-ignition engines is regulated for environmental reasons. Thus, vehicles equipped with compression-ignition engines often include after-treatment components such as particulate filters, catalyzed soot filters and adsorption catalysts for removing particulate matter and other regulated constituents (e.g., nitrogen oxides or NOx) from their exhaust streams. Particulate filters and other after-treatment components can be effective, but can also increase back pressure as they collect particulate matter.

Particulate matter may include ash and unburned carbon particles generally referred to as soot. As this carbon-based particulate matter accumulates in the after-treatment components, it can increase back pressure in the exhaust system. Engines that have large rates of particulate mass emission can develop excessive back pressure levels in a relatively short period of time, decreasing engine efficiency and power producing capacity. Therefore, it is desired to have particulate filtration systems that minimize back-pressure while effectively capturing particulate matter in the exhaust.

To accomplish both of these competing goals, after-treatment components must be regularly monitored and maintained either by replacing components or by removing the accumulated soot. Cleaning the accumulated soot from an after-treatment component can be achieved via oxidation to $CO_2$ (i.e., burning-off) and is known in the art as regeneration. To avoid service interruptions, regeneration is generally preferred over replacement of after-treatment components.

One way that regeneration may be accomplished is by increasing the temperatures of the filter material and/or the collected particulate matter to levels above the combustion temperature of the particulate matter. Elevating the temperature facilitates consumption of the soot by allowing the excess oxygen in the exhaust gas to oxidize the particulate matter. Particulate matter may also be oxidized, and thus removed, at lower temperatures by exposing the particulate matter to sufficient concentrations of nitrogen dioxide ($NO_2$). Exhaust from a compression-engine, such as a diesel engine, typically contains NOx, which consists primarily of nitric oxide (NO) and approximately 5 to 20 percent $NO_2$, with greater levels of $NO_2$ being common where oxidation catalysts are present in the exhaust stream. Thus, some level of regeneration occurs even at relatively low temperatures.

The regeneration process can be either passive or active. In passive systems, regeneration occurs whenever heat (e.g., carried by the exhaust gasses) and soot (e.g., trapped in the after-treatment components) are sufficient to facilitate oxidation, and/or whenever sufficient concentrations of $NO_2$ are present in the exhaust to enable oxidation at lower temperatures. In active systems, regeneration is induced at desired times by introducing heat from an outside source (e.g., an electrical heater, a fuel burner, a microwave heater, and/or from the engine itself, such as with a post in-cylinder injection or injection of fuel directly into the exhaust stream). Active regeneration can be initiated during various vehicle operations and exhaust conditions. Among these favorable operating conditions are stationary vehicle operations such as when the vehicle is at rest, for example, during a refueling stop. Engine control systems can be used to predict when it may be advantageous to actively facilitate a regeneration event and to effectuate control over the regeneration process.

An engine control system may use a soot model to deduce (i.e., predict) a mass of soot accumulated in the after-treatment component by monitoring properties of the exhaust stream as it flows through the after-treatment component. The control system can use the deduced soot mass data to monitor soot loading over time, to determine or anticipate when regeneration may be necessary or desirable, to facilitate a regeneration event, and/or to effectuate control over a regeneration process or other remedial measures. Soot models need to be accurate while accounting for a number of vehicle conditions without excessive calibration.

Accordingly, it is desirable to provide systems and methods for modeling engine-out soot flow rate to predict soot loading associated with a particulate filter.

SUMMARY OF THE INVENTION

In one exemplary embodiment, a method for engine-out soot flow rate prediction of an exhaust gas treatment system is provided. A measured level of oxides of nitrogen in the exhaust gas treatment system is received. An engine fuel injection timing and air-fuel ratio of an engine producing the oxides of nitrogen are also received. An engine timing factor is determined based on the engine fuel injection timing. An engine air-fuel ratio factor is determined based on the engine air-fuel ratio. An engine-out soot flow rate prediction is generated based on the measured level of oxides of nitrogen, the engine timing factor, and the engine air-fuel ratio factor.

In another exemplary embodiment, a control system that predicts engine-out soot flow rate of an exhaust gas treatment system is provided. The control system includes a first module configured to generate an engine-out soot flow rate prediction based on a measured level of oxides of nitrogen, an engine air-fuel ratio factor of an engine, and an engine timing factor of the engine. The engine timing factor is based on an engine fuel injection timing of the engine. A second module is configured to generate a particulate filter soot loading prediction based on the engine-out soot flow rate prediction. A third module is configured to control particulate filter regeneration based on the particulate filter soot loading prediction.

In yet another exemplary embodiment, an exhaust gas treatment system of an engine is provided. The exhaust gas treatment system includes a particulate filter, at least one sensor configured to measure a level of oxides of nitrogen, and a control module. The control module is configured to control regeneration of the particulate filter based on an engine-out soot flow rate prediction. The engine-out soot flow rate prediction is generated by the control module based on the measured level of oxides of nitrogen, an engine air-fuel ratio factor of the engine, and an engine timing factor of the engine. The engine timing factor is based on an engine fuel injection timing of the engine.

The above features and advantages and other features and advantages of the invention are readily apparent from the following detailed description of the invention when taken in connection with the accompanying drawings.

BRIEF DESCRIPTION OF THE DRAWINGS

Other features, advantages and details appear, by way of example only, in the following detailed description of embodiments, the detailed description referring to the drawings in which.

DESCRIPTION OF THE EMBODIMENTS

Figure 1:
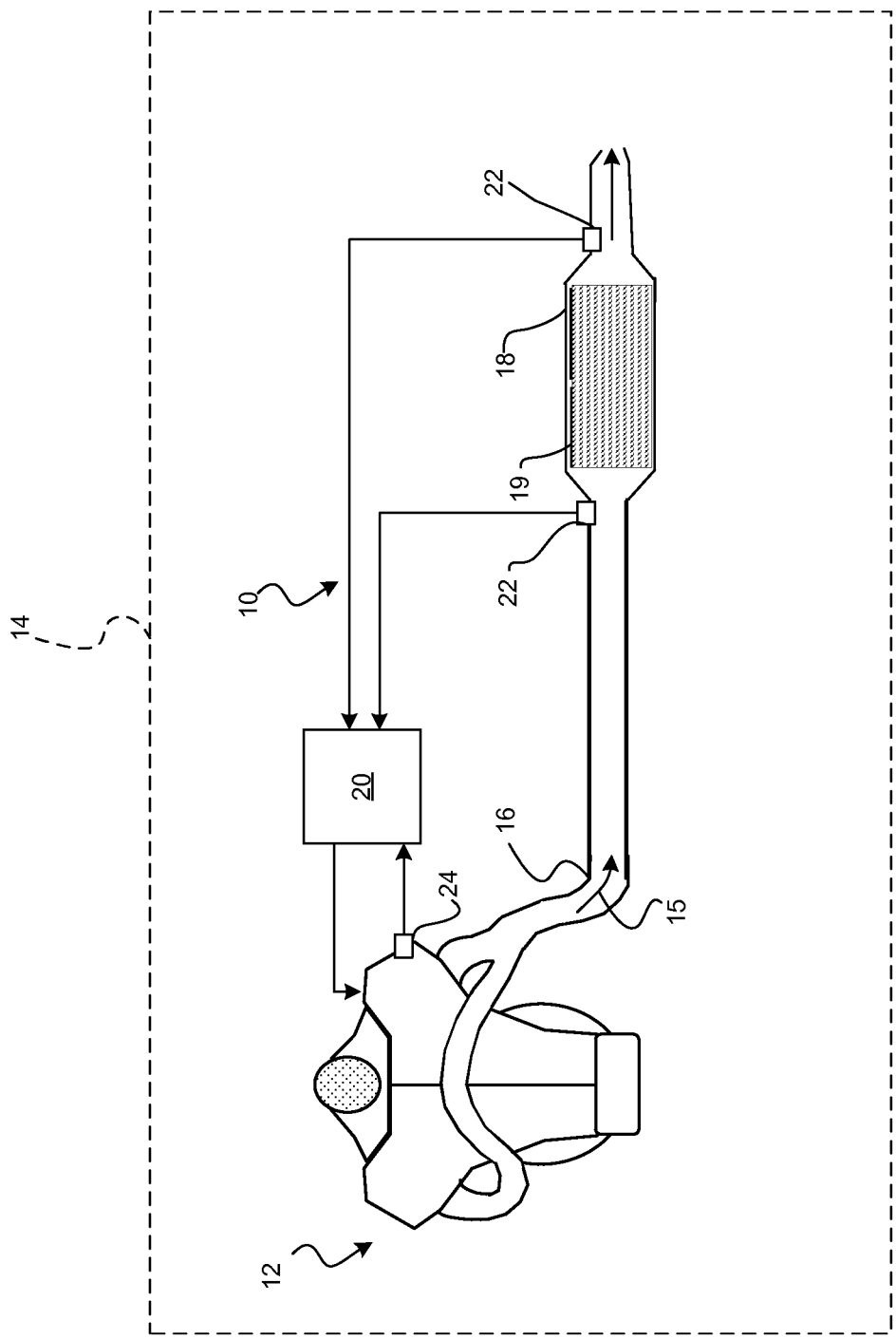
FIG. 1 is a functional block diagram of a vehicle including an exhaust system in accordance with exemplary embodiments.

The following description is merely exemplary in nature and is not intended to limit the present disclosure, its application or uses. It should be understood that throughout the drawings, corresponding reference numerals indicate like or corresponding parts and features. As used herein, the term "module" refers to an application specific integrated circuit (ASIC), an electronic circuit, a processor (shared, dedicated, or group) and memory that executes one or more software or firmware programs, a combinational logic circuit, and/or other suitable components that provide the described functionality. When implemented in software, a module can be embodied in memory as a non-transitory machine-readable storage medium readable by a processing circuit and storing instructions for execution by the processing circuit for performing a method.

Referring now to FIG. 1, exemplary embodiments are directed to an exhaust gas treatment system 10, for the reduction of regulated exhaust gas constituents of an internal combustion engine 12, including an engine of a vehicle 14 as well as engines used in various non-vehicular applications. As can be appreciated, the engine 12 can be of any engine type including, but not limited to, a diesel engine, a gasoline direct injection engine, a homogeneous charge compression ignition engine, or other engine type.

The exhaust gas treatment system 10 generally includes one or more exhaust gas conduits 16, and one or more exhaust treatment devices. In various embodiments, the exhaust treatment devices can include a particulate filter 18 and an oxidation catalyst device, a selective catalytic reduction device, and/or other treatment device.

In FIG. 1, the exhaust gas conduit 16, which may comprise several segments, transports exhaust gas 15 from the engine 12 to the various exhaust treatment devices of the exhaust gas treatment system 10. The exhaust treatment devices operate to filter the exhaust gas of emissions and particulate matter. The particulate filter 18, in particular, operates to filter the exhaust gas 15 of soot, including unburned carbon and other particulates. In various embodiments, the particulate filter 18 may be constructed using a wall flow monolith filter 19 or other filter devices such as wound or packed fiber filters, open cell foams, sintered metal fibers, etc. The filter 19 may be packaged in a shell or canister that is, for example, stainless steel, and that has an inlet and an outlet in fluid communication with exhaust gas conduit 16.

The accumulated particulate matter within the particulate filter 18 is periodically cleaned, or regenerated. Regeneration involves the oxidation or burning of the accumulated carbon and other particulates in what is typically a high temperature (>600° C.) environment.

A control module 20 controls the engine 12 and/or one or more exhaust components based on sensed and/or or modeled data. The sensed data can be received from one or more sensors 22 of the exhaust gas treatment system 10. At least one of the one or more sensors 22 is configured to measure a level of oxides of nitrogen and can be disposed within the exhaust treatment system 10, for example upstream and/or downstream of the particulate filter 18. The control module 20 also receives engine data from one or more sensors 24 of the engine 12. Data from the one or more sensors 24 of the engine 12 can be sent directly to the control module 20 or may be preprocessed to form various engine parameters prior to being received by the control module 20.

In various embodiments, the control module 20 controls regeneration of the particulate filter 18. For example, the control module 20 monitors various exhaust system parameters and engine parameters to determine when a regeneration event should begin or has completed. The control module 20 can implement an engine-out soot model to generate an engine-out soot flow rate prediction based on a measured level of oxides of nitrogen (NOx), an engine timing factor of the engine 12, and an engine air-fuel ratio factor of the engine 12. The engine-out soot flow rate prediction provides a model or predicted soot/particulate flow rate out of the engine 12 and into the particulate filter 18. The engine timing factor may be based on engine fuel injection timing of the engine 12. The engine air-fuel ratio factor may be based on an air-fuel ratio of the engine 12. The control module 20 can generate a particulate filter soot loading prediction based on the engine-out soot flow rate prediction. The control module 20 may control regeneration of the particulate filter 18 based on the particulate filter soot loading prediction.

Figure 2:
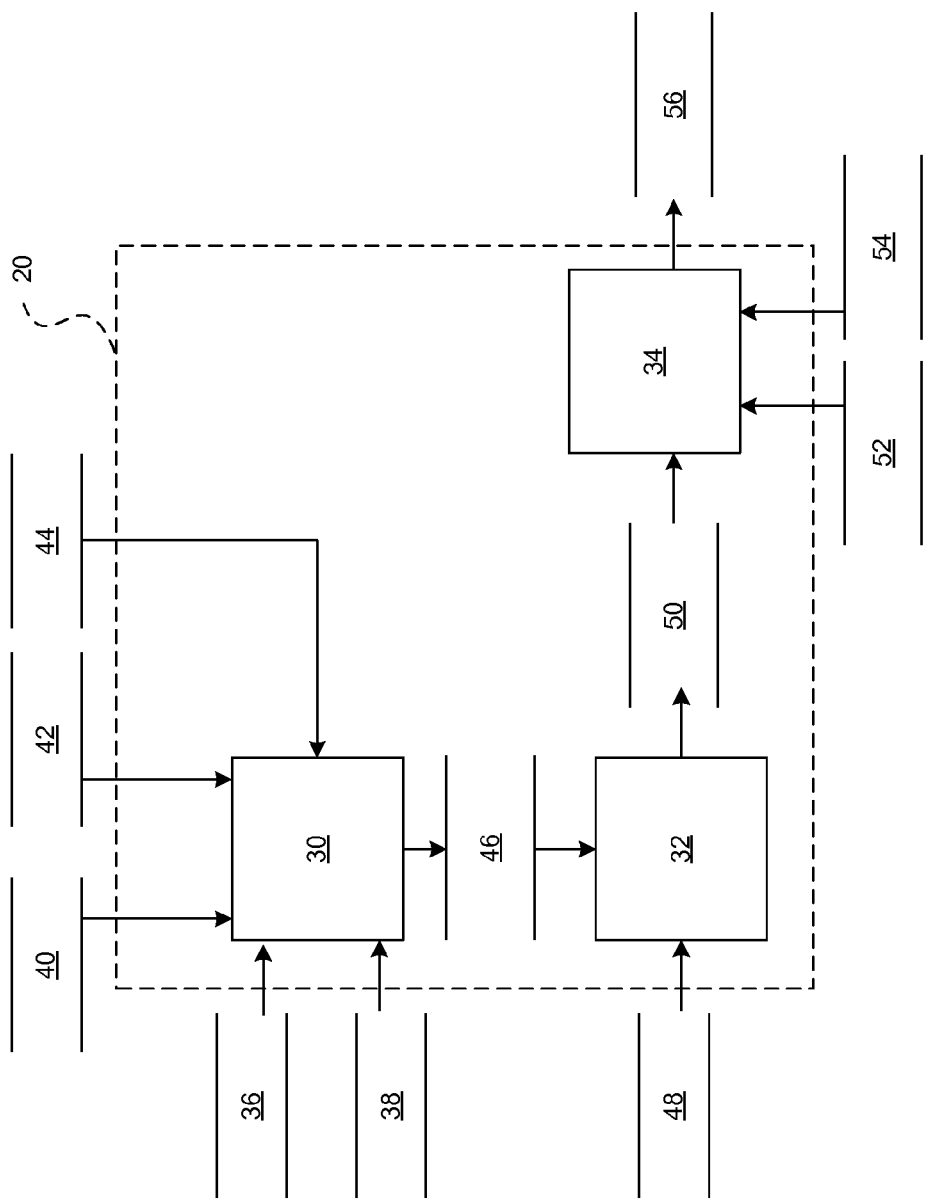
FIG. 2 is a dataflow diagram illustrating a control system of the exhaust system in accordance with exemplary embodiments.

Referring now to FIG. 2, a dataflow diagram illustrates various embodiments of a control system that may be embedded within the control module 20. Various embodiments of control systems according to the present disclosure may include any number of sub-modules embedded within the control module 20. As can be appreciated, the sub-modules shown in FIG. 2 may be combined and/or further partitioned to similarly model engine-out soot flow rate and particulate filter soot loading. Inputs to the system may be sensed from sensors (not shown) within the vehicle 14, received from other control modules (not shown), and/or determined/modeled by other sub-modules (not shown) within the control module 20. In various embodiments, the control module 20 includes an engine-out soot flow model module 30, a particulate filter control model module 32, and a particulate filter regeneration control module 34.

The engine-out soot flow model module 30 receives as inputs a first set of engine operating parameters 36 and a measured level of NOx 38. The engine-out soot flow model module 30 may also receive as inputs a power factor 40, an exponential coefficient 42, and/or base value maps 44. The first set of engine operating parameters 36 can be from the one or more sensors 24 of the engine 12 or other engine data sources. The first set of engine operating parameters 36 for the engine 14 may include, for example, engine fuel injection timing, air-fuel ratio, engine speed, and engine torque, as well as other engine parameters. The measured level of NOx 38 can be received from the one or more sensors 22 of the exhaust gas treatment system 10. The power factor 40 and the exponential coefficient 42 can be constants derived from empirical data or can be determined dynamically as a function of the engine speed, engine torque, and other engine parameters of the first set of engine operating parameters 36. The base value maps 44 can establish baseline values for a number of model parameters as function of the engine speed and engine torque, for example.

In embodiments, the engine-out soot flow model module 30 generates an engine-out soot flow rate prediction 46 based on the measured level of NOx 38, an engine timing factor derived from the engine fuel injection timing of the first set of engine operating parameters 36, and an engine air-fuel ratio factor derived from the air-fuel ratio of the first set of engine operating parameters 36. The engine timing factor is a decaying function that decreases as the engine fuel injection timing increases. For example, the engine timing factor may have a value of about 1.0 for an engine fuel injection timing of about −4 degrees and a value of about 0.5 for an engine fuel injection timing of about +4 degrees. When plotted for various values of the engine fuel injection timing, it can be seen that the engine-out soot flow rate prediction 46 varies relative to the measured level of NOx 38 as a family of substantially exponentially decaying curves. The relationship can be described by equation 1:

$$PM = A^{-B \; AFR}[NO_x f(Inj_{timing})]^{-\alpha}, \text{ where:}$$

PM is a particulate matter rate, also referred to as engine-out soot flow rate prediction 46;

A is a base engine soot value, which may be empirically determined;

e is an exponential function;

B is the exponential coefficient 42;

AFR is an air-fuel ratio from the first set of engine operating parameters 36;

$NO_x$ is the measured level of NOx 38;

$Inj_{timing}$ is the engine fuel injection timing from the first set of engine operating parameters 36;

$f(Inj_{timing})$ is the engine timing factor; and $\alpha$ is the power factor 40.

To simplify implementation and improve accuracy, equation 1 can be reformulated relative to base values in the base value maps 44. The base value maps 44 can be used to adjust base values for various conditions, such as engine speed and engine torque, to further improve model accuracy. Therefore, equation 2 represents an embodiment of equation 1, where equation 2 is:

$$PM = PM_{base} e^{-B(AFR-AFR_{base})} \left( \frac{NOx}{NOx_{base}} \frac{f(Inj_{timing})}{f(Inj_{timing\_base})} \right) - \alpha,$$

where:

$PM_{base}$ is a base engine soot value, which may be derived from the base value maps 44;

$AFR_{base}$ is a base air-fuel ratio, which may be derived from the base value maps 44;

$NO_{x \; base}$ is a base level of NOx, which may be derived from the base value maps 44;

$Inj_{timing\_base}$ is a base engine fuel injection timing, which may be derived from the base value maps 44; and $f(Inj_{timing\_base})$ is a base engine timing factor determined as a function of the base engine fuel injection timing.

As can be seen in equations 1 and 2, both the exponential coefficient 42 and the power factor 40 may be stored as negative values. The base value maps 44 can be implemented as equations or look-up tables to determine base values as a function of parameters selected from the first set of engine operating parameters 36, such as engine speed and engine torque. Timing, exponential, and power functions can also be implemented using direct calculations or look-up tables. By generating the engine-out soot flow rate prediction 46 as a function of the measured level of NOx 38, an engine timing factor based on the engine fuel injection timing, and an engine air-fuel ratio factor based on an air-fuel ratio, the engine-out soot flow model module 30 provides an accurate soot model while accounting for a number of vehicle conditions without excessive calibration.

In embodiments, the particulate filter control model module 32 receives the engine-out soot flow rate prediction 46 from the engine-out soot flow model module 30 and also receives a first set of exhaust system parameters 48. The first set of exhaust system parameters 48 may include sensed or derived parameters, such as nitrogen dioxide level, oxygen level, particulate filter inlet temperature, and an exhaust mass flow rate. Based on the engine-out soot flow rate prediction 46 and the first set of exhaust system parameters 48, the particulate filter control model module 32 generates a particulate filter soot loading prediction 50. The process of generating the particulate filter soot loading prediction 50 may be a conventional process known in the art.

The particulate filter regeneration control module 34 receives the particulate filter soot loading prediction 50, and may also receive a second set of engine operating parameters 52 and a second set of exhaust system parameters 54 as inputs. The particulate filter regeneration control module 34 determines whether regeneration of the particulate filter 18 (FIG. 1) is needed and initiates regeneration of the particulate filter 18 (FIG. 1) by generating control signals 56 to the engine 12 (FIG. 1) or other exhaust system component according to various regeneration methods known in the art. In various embodiments, regeneration may be needed, for example, after a certain time of engine operation has elapsed, or when engine operating conditions create certain exhaust flow characteristics that create excessive soot. Accordingly, the particulate filter regeneration control module 34 may control particulate filter regeneration based on the particulate filter soot loading prediction 50, and therefore indirectly based on the engine-out soot flow rate prediction 46.

Figure 3:
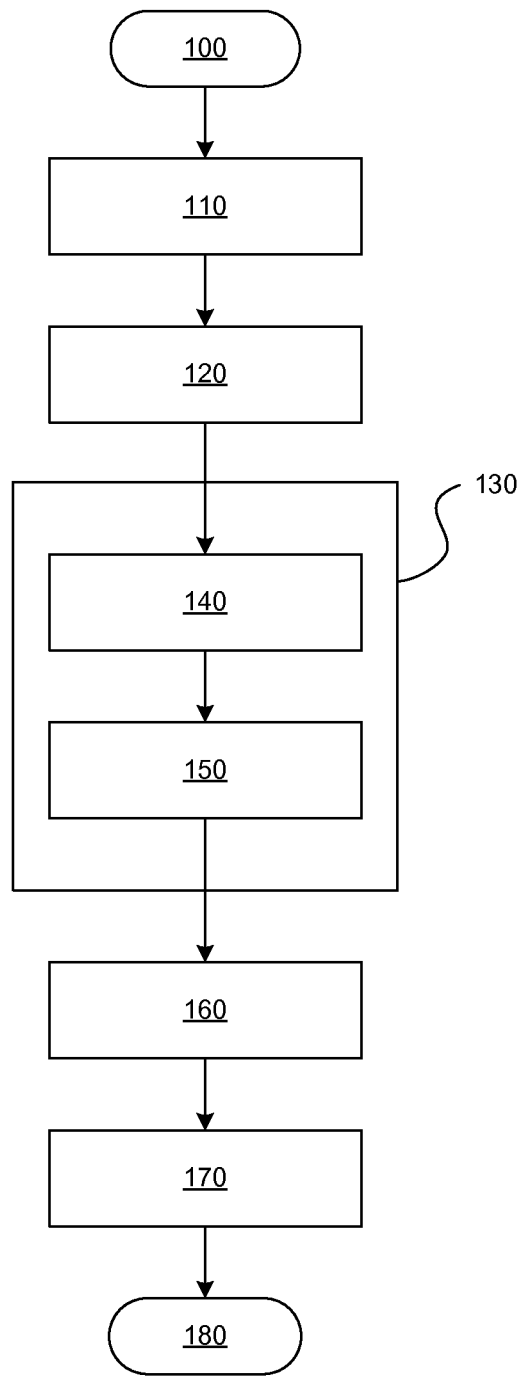
FIG. 3 is a flowchart illustrating an engine-out soot flow rate prediction method that may be performed in the exhaust system in accordance with exemplary embodiments.

Referring now to FIG. 3, and with continued reference to FIGS. 1 and 2, a flowchart illustrates a method for engine-out soot flow rate prediction of an exhaust gas treatment system that can be performed by the control module 20 of FIG. 1 in accordance with the present disclosure. As can be appreciated in light of the disclosure, the order of operation within the method is not limited to the sequential execution as illustrated in FIG. 3, but may be performed in one or more varying orders as applicable and in accordance with the present disclosure.

In various embodiments, the method can be scheduled to run based on predetermined events, and/or run continually during operation of the engine 12.

In one example, the method may begin at block 100. At block 110, various inputs of the control module 20 are received. For example, the measured level of NOx 38 in the exhaust gas treatment system 10 is received at the engine-out soot flow model module 30 of the control module 20. The engine fuel injection timing of the engine 14 producing the NOx is received in the first set of engine operating parameters 36 at the engine-out soot flow model module 30. The engine-out soot flow model module 30 may also receive an air-fuel ratio for the engine 14, an engine speed of the engine 14, and an engine torque of the engine 14 as part of the first set of engine operating parameters 36.

At block 120, the engine-out soot flow model module 30 determines an engine timing factor based on the engine fuel injection timing. The engine timing factor may be determined using a look-up table or equation that relates the engine timing factor to the engine fuel injection timing. In an embodiment, the engine timing factor is a decaying function relative to an increase in the engine fuel injection timing.

At block 130, the engine-out soot flow model module 30 generates the engine-out soot flow rate prediction 46 based on the measured level of NOx 38, the engine timing factor, and an engine air-fuel ratio factor. In one embodiment, block 130 includes sub-blocks 140 and 150.

At block 140, the engine-out soot flow model module 30 applies power factor 40 to a product of the measured level of NOx 38 and the engine timing factor to produce an unscaled engine-out soot flow rate prediction. When the base value maps 44 are used, the unscaled engine-out soot flow rate prediction can be produced as the product of the measured level of NOx 38 and the engine timing factor divided by a product of the base level of NOx and the base engine timing factor, and raised to the power factor 40. For example, the unscaled engine-out soot flow rate prediction can be equivalent to $[NO_x*f(Inj_{timing})]^{-\alpha}$ of equation 1 when base value maps 44 are not used, or $[(NO_x*f(Inj_{timing}))/(NO_{x\ base}*f(Inj_{timing\_base}))]^{-\alpha}$ of equation 2 when base value maps 44 are used. The base level of NOx can be determined based on the engine speed and the engine torque. Similarly, the base engine fuel injection timing can be determined based on the engine speed and the engine torque, where the base engine timing factor is a function of the base engine fuel injection timing.

At block 150, the engine-out soot flow model module 30 applies the engine air-fuel ratio factor to the unscaled engine-out soot flow rate prediction to generate the engine-out soot flow rate prediction 46. The engine air-fuel ratio factor can be determined based on the air-fuel ratio. When the base value maps 44 are used, an exponential engine air-fuel ratio factor can be determined as a negative exponential of a product of the exponential coefficient 42 and a difference between the air-fuel ratio and the base air-fuel ratio, and the engine air-fuel ratio factor can be produced as a product of the base engine soot value and the exponential engine air-fuel ratio factor. For example, the engine air-fuel ratio factor can be equivalent to $A*e^{-B\ AFR}$ of equation 1 when base value maps 44 are not used, or $PM_{base}*e^{-B*(AFR-AFRbase)}$ of equation 2 when base value maps 44 are used. The base engine soot value can be determined based on the engine speed and the engine torque. Similarly, the base air-fuel ratio can be determined based on the engine speed and the engine torque.

At block 160, the particulate filter control model module 32 generates particulate filter soot loading prediction 50 based on the engine-out soot flow rate prediction 46. As previously described, the particulate filter control model module 32 also receives a first set of exhaust system parameters 48 and may apply a conventional process known in the art to generate the particulate filter soot loading prediction 50 therefrom.

At block 170, the particulate filter regeneration control module 34 controls particulate filter regeneration of the particulate filter 18 based on the particulate filter soot loading prediction 50. As previously described, the particulate filter regeneration control module 34 may also receive a second set of engine operating parameters 52 and a second set of exhaust system parameters 54 as inputs to apply methods known in the art to generate control signals 56.

Thereafter, the method may end at block 180.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the application.

What is claimed is:

1. An exhaust gas treatment system of an engine, comprising:
    a particulate filter;
    at least one sensor configured to measure a level of oxides of nitrogen; and
    a control module configured to control regeneration of the particulate filter based on an engine-out soot flow rate prediction, the engine-out soot flow rate prediction generated by the control module based on the measured level of oxides of nitrogen, an engine air-fuel ratio factor of the engine, and an engine timing factor of the engine, the engine timing factor based on an engine fuel injection timing of the engine, and the control module is further configured to apply a power factor to a product of the measured level of oxides of nitrogen and the engine timing factor to produce an unscaled engine-out soot flow rate prediction and apply the engine air-fuel ratio factor to the unscaled engine-out soot flow rate prediction to generate the engine-out soot flow rate prediction.

2. The exhaust gas treatment system of claim 1 wherein the control module is further configured to receive an air-fuel ratio for the engine and determine the engine air-fuel ratio factor based on the air-fuel ratio.

3. The exhaust gas treatment system of claim 2 wherein the engine air-fuel ratio factor is a scaled negative exponential value based on the air-fuel ratio, and the power factor is a negative value.

4. The exhaust gas treatment system of claim 2 wherein the control module is further configured to receive an engine speed of the engine and an engine torque of the engine.

5. The exhaust gas treatment system of claim 4 wherein the control module is further configured to:
    determine a base level of oxides of nitrogen based on the engine speed and the engine torque;
    determine a base engine fuel injection timing based on the engine speed and the engine torque;
    determine a base engine timing factor as a function of the base engine fuel injection timing; and
    produce the unscaled engine-out soot flow rate prediction as the product of the measured level of oxides of nitrogen and the engine timing factor divided by a product of the base level of oxides of nitrogen and the base engine timing factor, and raised to the power factor.

6. The exhaust gas treatment system of claim 4 wherein the control module is further configured to:
    determine a base engine soot value based on the engine speed and the engine torque;
    determine a base air-fuel ratio based on the engine speed and the engine torque;
    determine an exponential engine air-fuel ratio factor as a negative exponential of a product of an exponential coefficient and a difference between the air-fuel ratio and the base air-fuel ratio; and
    produce the engine air-fuel ratio factor as a product of the base engine soot value and the exponential engine air-fuel ratio factor.

7. A method comprising:
    generating, by a control module of an exhaust gas treatment system, an engine-out soot flow rate prediction based on a measured level of oxides of nitrogen, an engine air-fuel ratio factor of an engine, and an engine timing factor of the engine, the engine timing factor based on an engine fuel injection timing of the engine, wherein the generating further comprises applying a power factor to a product of the measured level of oxides of nitrogen and the engine timing factor to produce an unscaled engine-out soot flow rate prediction, and applying the engine air-fuel ratio factor to the unscaled engine-out soot flow rate prediction to generate the engine-out soot flow rate prediction; and controlling, by the control module, regeneration of a particulate filter of the exhaust gas treatment system based on the engine-out soot flow rate prediction.

8. The method of claim 7 further comprising:
receiving an air-fuel ratio for the engine; and
determining the engine air-fuel ratio factor based on the air-fuel ratio.

9. The method of claim 8 wherein the engine air-fuel ratio factor is a scaled negative exponential value based on the air-fuel ratio, and the power factor is a negative value.

10. The method of claim 8 further comprising:
receiving an engine speed of the engine; and
receiving an engine torque of the engine.

11. The method of claim 10 further comprising:
determining a base level of oxides of nitrogen based on the engine speed and the engine torque;
determining a base engine fuel injection timing based on the engine speed and the engine torque;
determining a base engine timing factor as a function of the base engine fuel injection timing; and
producing the unscaled engine-out soot flow rate prediction as the product of the measured level of oxides of nitrogen and the engine timing factor divided by a product of the base level of oxides of nitrogen and the base engine timing factor, and raised to the power factor.

12. The method of claim 10 further comprising:
determining a base engine soot value based on the engine speed and the engine torque;
determining a base air-fuel ratio based on the engine speed and the engine torque;
determining an exponential engine air-fuel ratio factor as a negative exponential of a product of an exponential coefficient and a difference between the air-fuel ratio and the base air-fuel ratio; and
producing the engine air-fuel ratio factor as a product of the base engine soot value and the exponential engine air-fuel ratio factor.

* * * * *